US007813984B2

(12) United States Patent
Korzinin

(10) Patent No.: US 7,813,984 B2
(45) Date of Patent: Oct. 12, 2010

(54) METHOD AND SYSTEM FOR DETERMINING MODULATED VOLUME INFORMATION FOR A TRADEABLE FINANCIAL ELEMENT

(76) Inventor: Vladimir A. Korzinin, 4541 Mapleridge Drive, North Vancouver, British Columbia (CA) V7R 4M7

( * ) Notice: Subject to any disclaimer, the term of this patent is extended or adjusted under 35 U.S.C. 154(b) by 1240 days.

(21) Appl. No.: 11/184,878

(22) Filed: Jul. 20, 2005

(65) Prior Publication Data

US 2007/0022036 A1    Jan. 25, 2007

(51) Int. Cl.
    *G06Q 40/00* (2006.01)
(52) U.S. Cl. .................................. 705/36 R; 705/37
(58) Field of Classification Search ............... 705/35, 705/36 R, 38, 37, 39, 40
    See application file for complete search history.

(56) References Cited

U.S. PATENT DOCUMENTS

| | | | | |
|---|---|---|---|---|
| 5,402,520 | A | * | 3/1995 | Schnitta ........................ 706/16 |
| 5,457,797 | A | * | 10/1995 | Butterworth et al. ......... 719/320 |
| 6,505,174 | B1 | * | 1/2003 | Keiser et al. ............... 705/36 R |
| 2004/0225592 | A1 | * | 11/2004 | Churquina .................... 705/37 |
| 2005/0187855 | A1 | * | 8/2005 | Brennan et al. ............... 705/37 |
| 2006/0036542 | A1 | * | 2/2006 | McNair ........................ 705/39 |
| 2006/0116943 | A1 | * | 6/2006 | Willain ........................ 705/35 |
| 2006/0229969 | A1 | * | 10/2006 | Georgakopoulos ........... 705/37 |
| 2006/0235786 | A1 | * | 10/2006 | DiSalvo ........................ 705/37 |

OTHER PUBLICATIONS

Burke, Gibbons "The truth about futures and options.(The Computerized Trader)"Jun. 1998 Futures (Cedar Falls, Iowa) , v27 , n6 , p58(1).*
Chapman, Peter "Survival in the Age of Decimals: Banc of America's New Location, Formula and Trading Floor"Aug. 1, 2003 Traders Magazine pp. 68.*
"Confused About Volume", Traders', Jul./Aug. 2004, pp. 34-36.
"Volume Spikes and Index Reversals", The Technical Analyst, Issue 4, May 2004, pp. 23-25.
"Volume Tutorial: Normalized Volume". www.martetvolume.com, 2001.

* cited by examiner

*Primary Examiner*—Kelly Campen
(74) *Attorney, Agent, or Firm*—John R. Flanagan

(57) ABSTRACT

A method and system for determining modulated volume information for a tradeable element, such as a security or commodity. The invention compensates for normal fluctuations in volume occurring during the course of a trading period, thereby enabling convenient visualization of abnormal volume activity. In one embodiment, the invention involves providing a historical data source containing historical volume information for the tradeable element for a plurality of historical time intervals; obtaining unmodulated volume information for the tradeable element for a selected time interval in the trading period; retrieving from the historical data source selected data representing historical volume information for one or more of the historical time intervals corresponding to the selected time interval; and using the selected data to convert the unmodulated volume information for the selected time interval to modulated volume information for the selected time interval.

29 Claims, 24 Drawing Sheets

FIG. 3
(from 9:30 to 10:08)

| Trading time of the day | Raw Volume |
|---|---|
| 09:30 | 26,531,200 |
| 09:31 | 9,529,200 |
| 09:32 | 9,465,800 |
| 09:33 | 10,320,000 |
| 09:34 | 10,261,400 |
| 09:35 | 10,572,200 |
| 09:36 | 10,616,600 |
| 09:37 | 11,628,500 |
| 09:38 | 9,322,900 |
| 09:39 | 7,813,000 |
| 09:40 | 8,445,100 |
| 09:41 | 10,014,800 |
| 09:42 | 7,422,000 |
| 09:43 | 9,698,400 |
| 09:44 | 9,527,100 |
| 09:45 | 7,626,000 |
| 09:46 | 8,648,100 |
| 09:47 | 8,586,300 |
| 09:48 | 8,654,000 |
| 09:49 | 5,891,400 |
| 09:50 | 6,494,100 |
| 09:51 | 8,084,200 |
| 09:52 | 7,803,500 |
| 09:53 | 9,253,500 |
| 09:54 | 9,271,500 |
| 09:55 | 10,208,300 |
| 09:56 | 10,531,900 |
| 09:57 | 9,392,100 |
| 09:58 | 9,053,900 |
| 09:59 | 8,123,300 |
| 10:00 | 9,167,800 |
| 10:01 | 6,694,800 |
| 10:02 | 7,530,700 |
| 10:03 | 7,288,400 |
| 10:04 | 5,456,100 |
| 10:05 | 7,227,900 |
| 10:06 | 5,731,400 |
| 10:07 | 8,717,200 |
| 10:08 | 8,485,700 |

FIG. 3 (cont.)
(from 10:09 to 10:47)

| Trading time of the day | Raw Volume |
|---|---|
| 10:09 | 6,470,600 |
| 10:10 | 6,733,300 |
| 10:11 | 6,540,300 |
| 10:12 | 6,205,700 |
| 10:13 | 4,435,700 |
| 10:14 | 4,424,100 |
| 10:15 | 4,944,000 |
| 10:16 | 5,895,100 |
| 10:17 | 4,834,000 |
| 10:18 | 5,598,600 |
| 10:19 | 5,643,800 |
| 10:20 | 5,366,000 |
| 10:21 | 5,003,600 |
| 10:22 | 4,403,900 |
| 10:23 | 7,032,900 |
| 10:24 | 5,582,000 |
| 10:25 | 5,601,300 |
| 10:26 | 4,481,700 |
| 10:27 | 4,522,000 |
| 10:28 | 4,555,200 |
| 10:29 | 5,078,500 |
| 10:30 | 8,966,900 |
| 10:31 | 6,368,500 |
| 10:32 | 5,215,200 |
| 10:33 | 7,054,700 |
| 10:34 | 7,567,700 |
| 10:35 | 5,301,400 |
| 10:36 | 5,879,900 |
| 10:37 | 5,526,000 |
| 10:38 | 5,228,400 |
| 10:39 | 4,055,600 |
| 10:40 | 6,031,000 |
| 10:41 | 5,094,200 |
| 10:42 | 4,344,900 |
| 10:43 | 5,587,700 |
| 10:44 | 6,364,600 |
| 10:45 | 6,113,400 |
| 10:46 | 5,089,900 |
| 10:47 | 3,458,600 |

FIG. 3 (cont.)
(from 10:48 to 11:27)

| Trading time of the day | Raw Volume |
|---|---|
| 10:48 | 3,770,900 |
| 10:49 | 3,823,800 |
| 10:50 | 7,605,100 |
| 10:51 | 6,522,800 |
| 10:52 | 4,838,800 |
| 10:53 | 6,350,000 |
| 10:54 | 4,001,900 |
| 10:55 | 4,878,800 |
| 10:56 | 5,065,300 |
| 10:57 | 4,703,300 |
| 10:58 | 4,211,400 |
| 10:59 | 4,599,000 |
| 11:00 | 5,644,800 |
| 11:01 | 7,879,700 |
| 11:02 | 5,858,600 |
| 11:03 | 5,060,700 |
| 11:04 | 4,174,300 |
| 11:05 | 4,440,600 |
| 11:06 | 3,874,700 |
| 11:07 | 4,245,900 |
| 11:08 | 5,042,000 |
| 11:09 | 4,026,700 |
| 11:10 | 4,411,100 |
| 11:11 | 4,779,800 |
| 11:12 | 8,194,600 |
| 11:13 | 4,830,300 |
| 11:14 | 3,287,900 |
| 11:15 | 4,071,200 |
| 11:16 | 3,581,000 |
| 11:17 | 3,435,400 |
| 11:18 | 3,259,400 |
| 11:19 | 3,327,400 |
| 11:20 | 4,122,900 |
| 11:21 | 4,277,200 |
| 11:22 | 4,411,400 |
| 11:23 | 2,935,900 |
| 11:24 | 3,298,900 |
| 11:25 | 3,248,300 |
| 11:26 | 6,007,700 |

FIG. 3 (cont.)
(from 11:27 to 12:05)

| Trading time of the day | Raw Volume |
|---|---|
| 11:27 | 3,488,300 |
| 11:28 | 3,346,400 |
| 11:29 | 3,351,900 |
| 11:30 | 3,379,900 |
| 11:31 | 4,882,100 |
| 11:32 | 3,853,600 |
| 11:33 | 3,237,000 |
| 11:34 | 2,449,200 |
| 11:35 | 2,421,200 |
| 11:36 | 3,410,000 |
| 11:37 | 4,446,600 |
| 11:38 | 3,661,300 |
| 11:39 | 3,083,500 |
| 11:40 | 2,895,100 |
| 11:41 | 3,414,200 |
| 11:42 | 3,583,900 |
| 11:43 | 2,378,900 |
| 11:44 | 2,723,900 |
| 11:45 | 3,051,600 |
| 11:46 | 2,560,200 |
| 11:47 | 3,934,900 |
| 11:48 | 3,075,900 |
| 11:49 | 2,637,800 |
| 11:50 | 2,575,900 |
| 11:51 | 2,340,300 |
| 11:52 | 3,481,900 |
| 11:53 | 2,453,000 |
| 11:54 | 2,933,000 |
| 11:55 | 3,038,400 |
| 11:56 | 2,007,600 |
| 11:57 | 2,281,300 |
| 11:58 | 6,677,200 |
| 11:59 | 7,766,600 |
| 12:00 | 5,655,600 |
| 12:01 | 6,103,600 |
| 12:02 | 4,299,100 |
| 12:03 | 3,175,800 |
| 12:04 | 3,530,600 |
| 12:05 | 3,108,200 |

FIG. 3 (cont.)
(from 12:06 to 12:44)

| Trading time of the day | Raw Volume |
|---|---|
| 12:06 | 3,413,300 |
| 12:07 | 4,239,100 |
| 12:08 | 5,259,500 |
| 12:09 | 4,055,900 |
| 12:10 | 3,773,100 |
| 12:11 | 4,845,200 |
| 12:12 | 7,517,800 |
| 12:13 | 4,569,600 |
| 12:14 | 3,802,400 |
| 12:15 | 5,550,800 |
| 12:16 | 4,328,000 |
| 12:17 | 4,538,800 |
| 12:18 | 3,274,500 |
| 12:19 | 3,295,000 |
| 12:20 | 2,969,400 |
| 12:21 | 8,919,900 |
| 12:22 | 6,388,700 |
| 12:23 | 3,464,100 |
| 12:24 | 3,732,000 |
| 12:25 | 5,725,700 |
| 12:26 | 4,620,700 |
| 12:27 | 3,288,600 |
| 12:28 | 3,167,800 |
| 12:29 | 3,336,700 |
| 12:30 | 4,140,700 |
| 12:31 | 4,530,400 |
| 12:32 | 3,880,800 |
| 12:33 | 3,461,000 |
| 12:34 | 2,895,700 |
| 12:35 | 4,023,300 |
| 12:36 | 3,069,100 |
| 12:37 | 2,467,600 |
| 12:38 | 3,075,000 |
| 12:39 | 2,866,300 |
| 12:40 | 3,115,800 |
| 12:41 | 2,734,900 |
| 12:42 | 2,507,400 |
| 12:43 | 3,715,800 |
| 12:44 | 2,692,200 |

FIG. 3 (cont.)
(from 12:45 to 13:23)

| Trading time of the day | Raw Volume |
|---|---|
| 12:45 | 3,568,300 |
| 12:46 | 3,463,000 |
| 12:47 | 3,148,000 |
| 12:48 | 2,610,300 |
| 12:49 | 2,690,500 |
| 12:50 | 2,317,500 |
| 12:51 | 3,614,300 |
| 12:52 | 3,880,000 |
| 12:53 | 2,808,800 |
| 12:54 | 2,492,400 |
| 12:55 | 2,244,200 |
| 12:56 | 2,236,600 |
| 12:57 | 2,610,400 |
| 12:58 | 2,222,100 |
| 12:59 | 5,049,200 |
| 13:00 | 2,557,600 |
| 13:01 | 2,673,200 |
| 13:02 | 2,448,400 |
| 13:03 | 1,932,700 |
| 13:04 | 2,829,000 |
| 13:05 | 2,139,800 |
| 13:06 | 2,166,200 |
| 13:07 | 2,723,600 |
| 13:08 | 2,798,500 |
| 13:09 | 3,195,100 |
| 13:10 | 2,776,900 |
| 13:11 | 1,950,300 |
| 13:12 | 2,389,500 |
| 13:13 | 2,228,200 |
| 13:14 | 2,043,500 |
| 13:15 | 2,059,400 |
| 13:16 | 2,768,000 |
| 13:17 | 1,805,400 |
| 13:18 | 2,449,000 |
| 13:19 | 2,623,500 |
| 13:20 | 1,845,500 |
| 13:21 | 2,145,100 |
| 13:22 | 1,922,900 |
| 13:23 | 2,036,200 |

FIG. 3 (cont.)
(from 13:24 to 14:02)

| Trading time of the day | Raw Volume |
|---|---|
| 13:24 | 2,236,700 |
| 13:25 | 2,178,900 |
| 13:26 | 1,828,000 |
| 13:27 | 2,189,300 |
| 13:28 | 1,721,900 |
| 13:29 | 1,984,100 |
| 13:30 | 2,950,600 |
| 13:31 | 3,467,400 |
| 13:32 | 2,970,700 |
| 13:33 | 4,016,500 |
| 13:34 | 4,508,500 |
| 13:35 | 2,419,900 |
| 13:36 | 3,594,800 |
| 13:37 | 2,501,800 |
| 13:38 | 1,979,700 |
| 13:39 | 1,921,400 |
| 13:40 | 7,201,100 |
| 13:41 | 6,158,600 |
| 13:42 | 4,222,300 |
| 13:43 | 3,975,100 |
| 13:44 | 3,152,600 |
| 13:45 | 4,182,800 |
| 13:46 | 5,367,200 |
| 13:47 | 2,733,700 |
| 13:48 | 3,133,000 |
| 13:49 | 2,877,300 |
| 13:50 | 3,217,300 |
| 13:51 | 3,071,500 |
| 13:52 | 2,308,100 |
| 13:53 | 2,106,200 |
| 13:54 | 2,156,600 |
| 13:55 | 3,368,700 |
| 13:56 | 2,692,100 |
| 13:57 | 2,460,300 |
| 13:58 | 2,270,700 |
| 13:59 | 3,089,600 |
| 14:00 | 2,415,300 |
| 14:01 | 2,313,200 |
| 14:02 | 3,079,500 |

FIG. 3 (cont.)
(from 14:03 to 14:41)

| Trading time of the day | Raw Volume |
|---|---|
| 14:03 | 3,492,600 |
| 14:04 | 5,031,100 |
| 14:05 | 4,183,100 |
| 14:06 | 4,036,400 |
| 14:07 | 5,851,000 |
| 14:08 | 4,495,200 |
| 14:09 | 1,833,800 |
| 14:10 | 2,672,100 |
| 14:11 | 4,340,800 |
| 14:12 | 3,208,200 |
| 14:13 | 2,396,200 |
| 14:14 | 3,151,100 |
| 14:15 | 3,803,200 |
| 14:16 | 3,955,300 |
| 14:17 | 2,328,900 |
| 14:18 | 2,597,300 |
| 14:19 | 2,697,600 |
| 14:20 | 2,522,900 |
| 14:21 | 2,559,100 |
| 14:22 | 2,674,800 |
| 14:23 | 2,510,600 |
| 14:24 | 5,009,900 |
| 14:25 | 2,807,000 |
| 14:26 | 4,069,000 |
| 14:27 | 2,283,600 |
| 14:28 | 2,438,300 |
| 14:29 | 2,476,900 |
| 14:30 | 2,395,000 |
| 14:31 | 4,719,600 |
| 14:32 | 3,777,100 |
| 14:33 | 3,242,000 |
| 14:34 | 4,560,100 |
| 14:35 | 3,376,000 |
| 14:36 | 5,679,600 |
| 14:37 | 2,957,700 |
| 14:38 | 4,875,200 |
| 14:39 | 2,209,000 |
| 14:40 | 3,786,800 |
| 14:41 | 3,417,200 |

FIG. 3 (cont.)
(from 14:42 to 15:20)

| Trading time of the day | Raw Volume |
|---|---|
| 14:42 | 2,427,100 |
| 14:43 | 3,804,800 |
| 14:44 | 2,752,200 |
| 14:45 | 4,977,000 |
| 14:46 | 3,902,300 |
| 14:47 | 4,685,100 |
| 14:48 | 3,647,700 |
| 14:49 | 2,229,600 |
| 14:50 | 3,677,300 |
| 14:51 | 3,424,900 |
| 14:52 | 3,153,600 |
| 14:53 | 2,326,600 |
| 14:54 | 5,725,000 |
| 14:55 | 3,457,000 |
| 14:56 | 2,687,500 |
| 14:57 | 2,938,400 |
| 14:58 | 2,777,800 |
| 14:59 | 2,793,500 |
| 15:00 | 6,075,000 |
| 15:01 | 4,543,700 |
| 15:02 | 3,562,100 |
| 15:03 | 6,313,300 |
| 15:04 | 7,911,000 |
| 15:05 | 6,346,300 |
| 15:06 | 6,563,400 |
| 15:07 | 7,262,800 |
| 15:08 | 6,423,100 |
| 15:09 | 4,559,600 |
| 15:10 | 5,890,500 |
| 15:11 | 3,685,700 |
| 15:12 | 3,975,400 |
| 15:13 | 6,058,700 |
| 15:14 | 3,539,000 |
| 15:15 | 4,037,500 |
| 15:16 | 4,898,600 |
| 15:17 | 4,332,500 |
| 15:18 | 3,349,800 |
| 15:19 | 4,804,700 |
| 15:20 | 4,967,800 |

FIG. 3 (cont.)
(from 15:21 to 16:00)

| Trading time of the day | Raw Volume |
|---|---|
| 15:21 | 4,120,700 |
| 15:22 | 5,059,100 |
| 15:23 | 3,767,500 |
| 15:24 | 3,344,200 |
| 15:25 | 3,929,500 |
| 15:26 | 5,785,400 |
| 15:27 | 3,348,500 |
| 15:28 | 3,339,700 |
| 15:29 | 3,224,400 |
| 15:30 | 4,633,500 |
| 15:31 | 5,142,800 |
| 15:32 | 6,711,500 |
| 15:33 | 10,198,900 |
| 15:34 | 5,636,300 |
| 15:35 | 4,707,100 |
| 15:36 | 6,017,500 |
| 15:37 | 4,445,700 |
| 15:38 | 4,323,200 |
| 15:39 | 4,912,600 |
| 15:40 | 5,407,800 |
| 15:41 | 7,489,200 |
| 15:42 | 5,463,000 |
| 15:43 | 5,422,900 |
| 15:44 | 7,459,800 |
| 15:45 | 6,668,700 |
| 15:46 | 6,244,900 |
| 15:47 | 9,565,400 |
| 15:48 | 6,518,100 |
| 15:49 | 5,908,400 |
| 15:50 | 7,587,200 |
| 15:51 | 6,894,400 |
| 15:52 | 6,820,100 |
| 15:53 | 9,087,300 |
| 15:54 | 7,518,400 |
| 15:55 | 9,465,500 |
| 15:56 | 10,347,200 |
| 15:57 | 9,439,600 |
| 15:58 | 10,566,400 |
| 15:59 | 15,659,200 |
| 16:00 | 16,550,500 |

FIG. 7

| Trading time of the day | Average Volume | Referential Coefficient |
|---|---|---|
| 09:30:00 | 22,125,800 | 0.117 |
| 09:31:00 | 12,306,800 | 0.211 |
| 09:32:00 | 9,738,900 | 0.266 |
| 09:33:00 | 8,532,200 | 0.304 |
| 09:34:00 | 8,000,200 | 0.324 |
| 09:35:00 | 7,730,800 | 0.335 |
| 09:36:00 | 7,433,900 | 0.349 |
| 09:37:00 | 7,160,000 | 0.362 |
| 09:38:00 | 7,079,400 | 0.366 |
| 09:39:00 | 6,924,900 | 0.374 |
| 09:40:00 | 6,962,600 | 0.372 |
| 09:41:00 | 6,845,000 | 0.379 |
| 09:42:00 | 6,723,100 | 0.386 |
| 09:43:00 | 6,612,100 | 0.392 |
| 09:44:00 | 6,560,000 | 0.395 |
| 09:45:00 | 7,041,300 | 0.368 |
| 09:46:00 | 6,999,700 | 0.370 |
| 09:47:00 | 6,451,900 | 0.402 |
| 09:48:00 | 6,412,600 | 0.404 |
| 09:49:00 | 6,395,300 | 0.405 |
| 09:50:00 | 6,698,400 | 0.387 |
| 09:51:00 | 6,598,900 | 0.393 |
| 09:52:00 | 6,320,600 | 0.410 |
| 09:53:00 | 6,207,100 | 0.418 |
| 09:54:00 | 6,128,900 | 0.423 |
| 09:55:00 | 6,151,600 | 0.421 |
| 09:56:00 | 5,979,200 | 0.433 |
| 09:57:00 | 5,877,300 | 0.441 |
| 09:58:00 | 5,813,100 | 0.446 |
| 09:59:00 | 5,787,100 | 0.448 |
| 10:00:00 | 6,801,200 | 0.381 |
| 10:01:00 | 6,737,600 | 0.385 |
| 10:02:00 | 6,318,100 | 0.410 |
| 10:03:00 | 6,154,900 | 0.421 |
| 10:04:00 | 6,066,600 | 0.427 |
| 10:05:00 | 6,265,700 | 0.414 |
| 10:06:00 | 6,117,800 | 0.424 |
| 10:07:00 | 5,861,500 | 0.442 |
| 10:08:00 | 5,759,200 | 0.450 |

FIG. 7 (cont.)

| Trading time of the day | Average Volume | Referential Coefficient |
|---|---|---|
| 10:09:00 | 5,735,700 | 0.452 |
| 10:10:00 | 5,786,200 | 0.448 |
| 10:11:00 | 5,562,500 | 0.466 |
| 10:12:00 | 5,551,000 | 0.467 |
| 10:13:00 | 5,487,000 | 0.472 |
| 10:14:00 | 5,407,700 | 0.479 |
| 10:15:00 | 5,622,900 | 0.461 |
| 10:16:00 | 5,471,700 | 0.474 |
| 10:17:00 | 5,363,000 | 0.483 |
| 10:18:00 | 5,257,000 | 0.493 |
| 10:19:00 | 5,259,400 | 0.493 |
| 10:20:00 | 5,489,900 | 0.472 |
| 10:21:00 | 5,261,700 | 0.493 |
| 10:22:00 | 5,137,600 | 0.504 |
| 10:23:00 | 5,104,200 | 0.508 |
| 10:24:00 | 5,035,300 | 0.515 |
| 10:25:00 | 5,050,700 | 0.513 |
| 10:26:00 | 4,960,900 | 0.522 |
| 10:27:00 | 4,912,300 | 0.528 |
| 10:28:00 | 4,841,300 | 0.535 |
| 10:29:00 | 4,761,200 | 0.544 |
| 10:30:00 | 5,348,400 | 0.485 |
| 10:31:00 | 5,264,900 | 0.492 |
| 10:32:00 | 4,897,700 | 0.529 |
| 10:33:00 | 4,814,000 | 0.538 |
| 10:34:00 | 4,804,200 | 0.540 |
| 10:35:00 | 5,018,100 | 0.517 |
| 10:36:00 | 4,909,200 | 0.528 |
| 10:37:00 | 4,675,400 | 0.554 |
| 10:38:00 | 4,556,000 | 0.569 |
| 10:39:00 | 4,558,400 | 0.569 |
| 10:40:00 | 4,629,500 | 0.560 |
| 10:41:00 | 4,484,700 | 0.578 |
| 10:42:00 | 4,500,100 | 0.576 |
| 10:43:00 | 4,403,300 | 0.589 |
| 10:44:00 | 4,502,300 | 0.576 |
| 10:45:00 | 4,669,600 | 0.555 |
| 10:46:00 | 4,423,900 | 0.586 |
| 10:47:00 | 4,308,200 | 0.602 |

FIG. 7 (cont.)

| Trading time of the day | Average Volume | Referential Coefficient |
|---|---|---|
| 10:48:00 | 4,229,900 | 0.613 |
| 10:49:00 | 4,182,700 | 0.620 |
| 10:50:00 | 4,359,100 | 0.595 |
| 10:51:00 | 4,297,400 | 0.603 |
| 10:52:00 | 4,180,100 | 0.620 |
| 10:53:00 | 4,144,400 | 0.625 |
| 10:54:00 | 4,150,100 | 0.625 |
| 10:55:00 | 4,182,600 | 0.620 |
| 10:56:00 | 4,085,600 | 0.634 |
| 10:57:00 | 4,001,700 | 0.648 |
| 10:58:00 | 4,036,400 | 0.642 |
| 10:59:00 | 3,981,800 | 0.651 |
| 11:00:00 | 4,426,400 | 0.586 |
| 11:01:00 | 4,244,200 | 0.611 |
| 11:02:00 | 4,018,300 | 0.645 |
| 11:03:00 | 4,003,400 | 0.647 |
| 11:04:00 | 4,055,100 | 0.639 |
| 11:05:00 | 4,354,600 | 0.595 |
| 11:06:00 | 4,195,100 | 0.618 |
| 11:07:00 | 3,975,600 | 0.652 |
| 11:08:00 | 3,911,600 | 0.663 |
| 11:09:00 | 3,905,700 | 0.664 |
| 11:10:00 | 3,985,200 | 0.650 |
| 11:11:00 | 3,857,100 | 0.672 |
| 11:12:00 | 3,814,300 | 0.680 |
| 11:13:00 | 3,756,200 | 0.690 |
| 11:14:00 | 3,747,000 | 0.692 |
| 11:15:00 | 3,874,300 | 0.669 |
| 11:16:00 | 3,795,400 | 0.683 |
| 11:17:00 | 3,724,900 | 0.696 |
| 11:18:00 | 3,724,300 | 0.696 |
| 11:19:00 | 3,694,300 | 0.702 |
| 11:20:00 | 3,789,300 | 0.684 |
| 11:21:00 | 3,754,300 | 0.690 |
| 11:22:00 | 3,693,300 | 0.702 |
| 11:23:00 | 3,654,200 | 0.709 |
| 11:24:00 | 3,594,300 | 0.721 |
| 11:25:00 | 3,635,700 | 0.713 |
| 11:26:00 | 3,524,000 | 0.735 |

FIG. 7 (cont.)

| Trading time of the day | Average Volume | Referential Coefficient |
|---|---|---|
| 11:27:00 | 3,577,700 | 0.724 |
| 11:28:00 | 3,578,200 | 0.724 |
| 11:29:00 | 3,525,000 | 0.735 |
| 11:30:00 | 3,899,400 | 0.665 |
| 11:31:00 | 3,799,200 | 0.682 |
| 11:32:00 | 3,600,600 | 0.720 |
| 11:33:00 | 3,529,500 | 0.734 |
| 11:34:00 | 3,491,100 | 0.742 |
| 11:35:00 | 3,540,500 | 0.732 |
| 11:36:00 | 3,440,500 | 0.753 |
| 11:37:00 | 3,428,900 | 0.756 |
| 11:38:00 | 3,370,500 | 0.769 |
| 11:39:00 | 3,419,500 | 0.758 |
| 11:40:00 | 3,476,600 | 0.746 |
| 11:41:00 | 3,419,800 | 0.758 |
| 11:42:00 | 3,371,600 | 0.769 |
| 11:43:00 | 3,290,700 | 0.788 |
| 11:44:00 | 3,243,800 | 0.799 |
| 11:45:00 | 3,442,700 | 0.753 |
| 11:46:00 | 3,408,600 | 0.760 |
| 11:47:00 | 3,272,400 | 0.792 |
| 11:48:00 | 3,259,900 | 0.795 |
| 11:49:00 | 3,263,600 | 0.794 |
| 11:50:00 | 3,294,900 | 0.787 |
| 11:51:00 | 3,196,200 | 0.811 |
| 11:52:00 | 3,171,300 | 0.817 |
| 11:53:00 | 3,111,900 | 0.833 |
| 11:54:00 | 3,106,300 | 0.834 |
| 11:55:00 | 3,236,200 | 0.801 |
| 11:56:00 | 3,197,500 | 0.811 |
| 11:57:00 | 3,169,800 | 0.818 |
| 11:58:00 | 3,106,900 | 0.834 |
| 11:59:00 | 3,176,800 | 0.816 |
| 12:00:00 | 3,526,000 | 0.735 |
| 12:01:00 | 3,380,100 | 0.767 |
| 12:02:00 | 3,209,300 | 0.808 |
| 12:03:00 | 3,162,500 | 0.820 |
| 12:04:00 | 3,136,500 | 0.826 |
| 12:05:00 | 3,401,100 | 0.762 |

FIG. 7 (cont.)

| Trading time of the day | Average Volume | Referential Coefficient |
|---|---|---|
| 12:06:00 | 3,284,800 | 0.789 |
| 12:07:00 | 3,046,300 | 0.851 |
| 12:08:00 | 2,971,100 | 0.872 |
| 12:09:00 | 2,998,700 | 0.864 |
| 12:10:00 | 3,151,300 | 0.822 |
| 12:11:00 | 3,020,300 | 0.858 |
| 12:12:00 | 2,925,600 | 0.886 |
| 12:13:00 | 2,879,700 | 0.900 |
| 12:14:00 | 2,916,000 | 0.889 |
| 12:15:00 | 3,060,900 | 0.847 |
| 12:16:00 | 2,921,900 | 0.887 |
| 12:17:00 | 2,820,900 | 0.919 |
| 12:18:00 | 2,815,700 | 0.921 |
| 12:19:00 | 2,759,200 | 0.939 |
| 12:20:00 | 2,872,500 | 0.902 |
| 12:21:00 | 2,824,500 | 0.918 |
| 12:22:00 | 2,768,400 | 0.936 |
| 12:23:00 | 2,768,700 | 0.936 |
| 12:24:00 | 2,782,600 | 0.931 |
| 12:25:00 | 2,829,100 | 0.916 |
| 12:26:00 | 2,755,600 | 0.941 |
| 12:27:00 | 2,644,600 | 0.980 |
| 12:28:00 | 2,685,400 | 0.965 |
| 12:29:00 | 2,682,400 | 0.966 |
| 12:30:00 | 3,011,600 | 0.861 |
| 12:31:00 | 2,910,300 | 0.891 |
| 12:32:00 | 2,816,900 | 0.920 |
| 12:33:00 | 2,747,300 | 0.943 |
| 12:34:00 | 2,991,000 | 0.867 |
| 12:35:00 | 2,798,900 | 0.926 |
| 12:36:00 | 2,705,200 | 0.958 |
| 12:37:00 | 2,685,600 | 0.965 |
| 12:38:00 | 2,673,400 | 0.970 |
| 12:39:00 | 2,683,800 | 0.966 |
| 12:40:00 | 2,772,700 | 0.935 |
| 12:41:00 | 2,612,200 | 0.992 |
| 12:42:00 | 2,651,300 | 0.978 |
| 12:43:00 | 2,637,700 | 0.983 |
| 12:44:00 | 2,669,800 | 0.971 |

FIG. 7 (cont.)

| Trading time of the day | Average Volume | Referential Coefficient |
|---|---|---|
| 12:45:00 | 2,807,900 | 0.923 |
| 12:46:00 | 2,693,400 | 0.962 |
| 12:47:00 | 2,640,900 | 0.981 |
| 12:48:00 | 2,690,200 | 0.963 |
| 12:49:00 | 2,594,000 | 0.999 |
| 12:50:00 | 3,093,800 | 0.838 |
| 12:51:00 | 2,719,800 | 0.953 |
| 12:52:00 | 2,655,900 | 0.976 |
| 12:53:00 | 2,605,100 | 0.995 |
| 12:54:00 | 2,625,800 | 0.987 |
| 12:55:00 | 2,730,700 | 0.949 |
| 12:56:00 | 2,591,900 | 1.000 |
| 12:57:00 | 2,606,200 | 0.995 |
| 12:58:00 | 2,601,900 | 0.996 |
| 12:59:00 | 2,603,800 | 0.995 |
| 13:00:00 | 3,000,800 | 0.864 |
| 13:01:00 | 2,793,100 | 0.928 |
| 13:02:00 | 2,709,500 | 0.957 |
| 13:03:00 | 2,682,900 | 0.966 |
| 13:04:00 | 2,697,600 | 0.961 |
| 13:05:00 | 3,228,300 | 0.803 |
| 13:06:00 | 2,815,500 | 0.921 |
| 13:07:00 | 2,653,900 | 0.977 |
| 13:08:00 | 2,668,700 | 0.971 |
| 13:09:00 | 2,740,900 | 0.946 |
| 13:10:00 | 2,797,800 | 0.926 |
| 13:11:00 | 2,712,600 | 0.956 |
| 13:12:00 | 2,694,500 | 0.962 |
| 13:13:00 | 2,648,000 | 0.979 |
| 13:14:00 | 2,656,500 | 0.976 |
| 13:15:00 | 2,862,500 | 0.905 |
| 13:16:00 | 2,796,000 | 0.927 |
| 13:17:00 | 2,913,000 | 0.890 |
| 13:18:00 | 2,733,600 | 0.948 |
| 13:19:00 | 2,716,100 | 0.954 |
| 13:20:00 | 2,815,300 | 0.921 |
| 13:21:00 | 2,735,600 | 0.947 |
| 13:22:00 | 2,771,100 | 0.935 |
| 13:23:00 | 2,688,500 | 0.964 |

FIG. 7 (cont.)

| Trading time of the day | Average Volume | Referential Coefficient |
|---|---|---|
| 13:24:00 | 2,704,600 | 0.958 |
| 13:25:00 | 2,795,300 | 0.927 |
| 13:26:00 | 2,692,100 | 0.963 |
| 13:27:00 | 2,753,100 | 0.941 |
| 13:28:00 | 2,692,300 | 0.963 |
| 13:29:00 | 3,083,500 | 0.841 |
| 13:30:00 | 3,216,400 | 0.806 |
| 13:31:00 | 2,914,200 | 0.889 |
| 13:32:00 | 2,821,100 | 0.919 |
| 13:33:00 | 2,783,200 | 0.931 |
| 13:34:00 | 2,764,700 | 0.937 |
| 13:35:00 | 2,786,800 | 0.930 |
| 13:36:00 | 2,761,500 | 0.939 |
| 13:37:00 | 2,740,600 | 0.946 |
| 13:38:00 | 2,748,100 | 0.943 |
| 13:39:00 | 2,737,300 | 0.947 |
| 13:40:00 | 2,897,400 | 0.895 |
| 13:41:00 | 2,828,600 | 0.916 |
| 13:42:00 | 2,815,900 | 0.920 |
| 13:43:00 | 2,782,100 | 0.932 |
| 13:44:00 | 2,747,500 | 0.943 |
| 13:45:00 | 2,938,600 | 0.882 |
| 13:46:00 | 2,863,100 | 0.905 |
| 13:47:00 | 2,860,200 | 0.906 |
| 13:48:00 | 2,863,000 | 0.905 |
| 13:49:00 | 2,878,200 | 0.901 |
| 13:50:00 | 3,020,900 | 0.858 |
| 13:51:00 | 2,897,500 | 0.895 |
| 13:52:00 | 2,935,500 | 0.883 |
| 13:53:00 | 2,895,900 | 0.895 |
| 13:54:00 | 2,845,300 | 0.911 |
| 13:55:00 | 2,947,700 | 0.879 |
| 13:56:00 | 2,942,200 | 0.881 |
| 13:57:00 | 2,892,900 | 0.896 |
| 13:58:00 | 2,915,900 | 0.889 |
| 13:59:00 | 2,948,400 | 0.879 |
| 14:00:00 | 3,464,000 | 0.748 |
| 14:01:00 | 3,320,500 | 0.781 |
| 14:02:00 | 3,238,400 | 0.800 |

FIG. 7 (cont.)

| Trading time of the day | Average Volume | Referential Coefficient |
|---|---|---|
| 14:03:00 | 3,238,500 | 0.800 |
| 14:04:00 | 3,217,800 | 0.805 |
| 14:05:00 | 3,398,800 | 0.763 |
| 14:06:00 | 3,297,400 | 0.786 |
| 14:07:00 | 3,167,900 | 0.818 |
| 14:08:00 | 3,106,700 | 0.834 |
| 14:09:00 | 3,145,700 | 0.824 |
| 14:10:00 | 3,307,600 | 0.784 |
| 14:11:00 | 3,203,400 | 0.809 |
| 14:12:00 | 3,228,300 | 0.803 |
| 14:13:00 | 3,193,900 | 0.812 |
| 14:14:00 | 3,216,200 | 0.806 |
| 14:15:00 | 3,417,600 | 0.758 |
| 14:16:00 | 3,350,100 | 0.774 |
| 14:17:00 | 3,341,600 | 0.776 |
| 14:18:00 | 3,325,800 | 0.779 |
| 14:19:00 | 3,326,900 | 0.779 |
| 14:20:00 | 3,473,500 | 0.746 |
| 14:21:00 | 3,390,400 | 0.764 |
| 14:22:00 | 3,323,700 | 0.780 |
| 14:23:00 | 3,348,000 | 0.774 |
| 14:24:00 | 3,421,700 | 0.757 |
| 14:25:00 | 3,445,500 | 0.752 |
| 14:26:00 | 3,332,500 | 0.778 |
| 14:27:00 | 3,373,800 | 0.768 |
| 14:28:00 | 3,374,900 | 0.768 |
| 14:29:00 | 3,426,900 | 0.756 |
| 14:30:00 | 4,156,500 | 0.624 |
| 14:31:00 | 3,586,000 | 0.723 |
| 14:32:00 | 3,502,700 | 0.740 |
| 14:33:00 | 3,526,000 | 0.735 |
| 14:34:00 | 3,484,500 | 0.744 |
| 14:35:00 | 3,547,400 | 0.731 |
| 14:36:00 | 3,484,400 | 0.744 |
| 14:37:00 | 3,501,600 | 0.740 |
| 14:38:00 | 3,410,700 | 0.760 |
| 14:39:00 | 3,422,500 | 0.757 |
| 14:40:00 | 3,652,700 | 0.710 |
| 14:41:00 | 3,464,500 | 0.748 |
| 14:42:00 | 3,453,800 | 0.750 |

FIG. 7 (cont.)

| Trading time of the day | Average Volume | Referential Coefficient |
|---|---|---|
| 14:43:00 | 3,455,700 | 0.750 |
| 14:44:00 | 3,477,200 | 0.745 |
| 14:45:00 | 3,770,800 | 0.687 |
| 14:46:00 | 3,658,400 | 0.708 |
| 14:47:00 | 3,540,100 | 0.732 |
| 14:48:00 | 3,529,200 | 0.734 |
| 14:49:00 | 3,523,300 | 0.736 |
| 14:50:00 | 3,724,200 | 0.696 |
| 14:51:00 | 3,674,300 | 0.705 |
| 14:52:00 | 3,681,800 | 0.704 |
| 14:53:00 | 3,628,400 | 0.714 |
| 14:54:00 | 3,663,400 | 0.708 |
| 14:55:00 | 3,878,200 | 0.668 |
| 14:56:00 | 3,742,500 | 0.693 |
| 14:57:00 | 3,734,900 | 0.694 |
| 14:58:00 | 3,721,700 | 0.696 |
| 14:59:00 | 3,781,000 | 0.686 |
| 15:00:00 | 4,209,500 | 0.616 |
| 15:01:00 | 4,111,300 | 0.630 |
| 15:02:00 | 3,977,600 | 0.652 |
| 15:03:00 | 3,996,500 | 0.649 |
| 15:04:00 | 3,971,600 | 0.653 |
| 15:05:00 | 4,339,500 | 0.597 |
| 15:06:00 | 4,216,000 | 0.615 |
| 15:07:00 | 4,015,700 | 0.645 |
| 15:08:00 | 3,989,700 | 0.650 |
| 15:09:00 | 3,992,700 | 0.649 |
| 15:10:00 | 4,272,700 | 0.607 |
| 15:11:00 | 4,105,700 | 0.631 |
| 15:12:00 | 4,108,500 | 0.631 |
| 15:13:00 | 4,128,700 | 0.628 |
| 15:14:00 | 4,137,400 | 0.626 |
| 15:15:00 | 4,426,100 | 0.586 |
| 15:16:00 | 4,282,300 | 0.605 |
| 15:17:00 | 4,224,900 | 0.613 |
| 15:18:00 | 4,259,800 | 0.608 |
| 15:19:00 | 4,220,600 | 0.614 |
| 15:20:00 | 4,491,300 | 0.577 |

FIG. 7 (cont.)

| Trading time of the day | Average Volume | Referential Coefficient |
|---|---|---|
| 15:21:00 | 4,403,700 | 0.589 |
| 15:22:00 | 4,327,900 | 0.599 |
| 15:23:00 | 4,406,000 | 0.588 |
| 15:24:00 | 4,355,000 | 0.595 |
| 15:25:00 | 4,524,500 | 0.573 |
| 15:26:00 | 4,528,500 | 0.572 |
| 15:27:00 | 4,486,800 | 0.578 |
| 15:28:00 | 4,486,100 | 0.578 |
| 15:29:00 | 4,583,800 | 0.565 |
| 15:30:00 | 5,172,800 | 0.501 |
| 15:31:00 | 5,070,100 | 0.511 |
| 15:32:00 | 4,977,100 | 0.521 |
| 15:33:00 | 4,984,800 | 0.520 |
| 15:34:00 | 4,925,800 | 0.526 |
| 15:35:00 | 5,082,400 | 0.510 |
| 15:36:00 | 5,040,700 | 0.514 |
| 15:37:00 | 4,979,300 | 0.521 |
| 15:38:00 | 4,995,200 | 0.519 |
| 15:39:00 | 5,023,600 | 0.516 |
| 15:40:00 | 5,392,700 | 0.481 |
| 15:41:00 | 5,629,000 | 0.460 |
| 15:42:00 | 5,545,800 | 0.467 |
| 15:43:00 | 5,520,600 | 0.469 |
| 15:44:00 | 5,588,800 | 0.464 |
| 15:45:00 | 6,108,000 | 0.424 |
| 15:46:00 | 6,055,000 | 0.428 |
| 15:47:00 | 5,930,500 | 0.437 |
| 15:48:00 | 6,075,100 | 0.427 |
| 15:49:00 | 6,062,600 | 0.428 |
| 15:50:00 | 6,923,500 | 0.374 |
| 15:51:00 | 6,889,300 | 0.376 |
| 15:52:00 | 6,947,000 | 0.373 |
| 15:53:00 | 6,952,700 | 0.373 |
| 15:54:00 | 7,203,200 | 0.360 |
| 15:55:00 | 7,742,800 | 0.335 |
| 15:56:00 | 8,246,300 | 0.314 |
| 15:57:00 | 8,962,900 | 0.289 |
| 15:58:00 | 10,347,000 | 0.250 |
| 15:59:00 | 13,035,600 | 0.199 |
| 16:00:00 | 12,528,300 | 0.207 |

METHOD AND SYSTEM FOR DETERMINING MODULATED VOLUME INFORMATION FOR A TRADEABLE FINANCIAL ELEMENT

TECHNICAL FIELD

This application relates to a method and system for determining modulated volume information for a tradeable element, such as a security or commodity.

BACKGROUND

Advances in technology have increased the number of avenues for traders to invest in stocks, bonds, futures, convertible securities, commodities and other tradeable elements in markets worldwide. This trend has also increased the need for delivery of timely trading data to investors. It is now commonplace for traders to access market analysis tools electronically via e-mail or website access.

Many technical analysis tools focus on price as the key market indicator. For example, tools based on moving averages of securities prices are well-known. However, an equally important factor that is often overlooked is market volume. Volume represents the actual supply and demand that moves prices higher and lower. Volume is therefore an important indicator that can offer key insights into the strength of a market trend.

Volume analytics can be employed, for example, to forecast reversals in stock exchange indices. In the case of a securities index, sudden surges in trading volume indicate bursts of significant buying or selling activity. There are many complex reasons why this might occur. If the index price trend is rising when a volume surge occurs, this is typically referred to as a "resistive" volume spike. On the other hand, if the index price trend is declining when the volume surge occurs, this is referred to as a "supportive" volume spike. As a general rule, resistive volume spikes will force a downward move in an index whereas supportive volume spikes generate upward index momentum.

However, it is often very difficult using conventional market analysis tools to identify volume fluctuations which are truly significant. Many currently available systems are limited to delivering daily delayed data and fail to take into account volume fluctuations which occur at intervals within the trading period. In many cases volume activity follows predictable patterns throughout the trading day. High volume levels are usually prevalent immediately after the markets open due to trades left over from the previous day and a large amount of at-market-open orders. Lower values occur around noon when traders typically take their lunch break, thereby lowering the number of active participants in the market. Increased volume levels once again occur toward the end of the trading day when many short-term traders and institutional investors close their positions. Thus the time of the day often has a direct influence on volume activity. It is therefore often difficult to differentiate abnormal, analytically significant volume fluctuations from historically normal intra-day variations.

Some systems are known in the prior art for attempting to normalize volume data so that at least some cyclic intra-day fluctuations are discounted and abnormal volume variations can be more readily visualized. For example, as described further below, some systems rely on standard trade distribution profiles which are intended to approximate typical market activity patterns. There are several significant drawbacks to this approach. First, not all markets for tradeable elements will exhibit the standard profile. Second, even in the case of tradeable elements which ordinarily do track the standard profile, important deviations may occur at some trading intervals due to various extraneous factors. In such cases, the normalized data may obscure important volume spikes or suggest market abnormalities where none exist. Accordingly, in many cases conventional systems yield inaccurate results and cannot be applied generally to all market scenarios.

The need has therefore arisen for improved methods and systems for modulating volume information which rely on actual historical volume data for the tradeable element in question rather than imprecise trade distribution profiles.

SUMMARY OF INVENTION

In accordance with one embodiment of the invention, a method of modulating volume information for a tradeable element to compensate for normal variation in said volume information during a trading period is described. The method comprises:

(a) providing a historical data source containing historical volume information for the tradeable element for a plurality of historical time intervals;

(b) obtaining unmodulated volume information for the tradeable element for a selected time interval in the trading period;

(c) retrieving from the historical data source selected data representing historical volume information for one or more of the historical time intervals corresponding to the selected time interval; and (d) using the selected data to convert the unmodulated volume information for the selected time interval to modulated volume information for the selected time interval.

The invention also relates to a system for implementing the above-described method. In one embodiment of the invention, the system may include a data processor comprising:

(a) a data input for obtaining unmodulated volume information for the tradeable element for a selected time interval in the trading period;

(b) a historical data retriever for retrieving selected historical data from a historical data source containing historical volume information for the tradeable element for a plurality of historical time intervals, wherein the retriever retrieves selected data representing historical volume information for one or more of the historical time intervals corresponding to the selected time interval; and (c) at least one algorithm using the selected data to convert the unmodulated volume information for the selected time interval to modulated volume information for the selected time interval.

BRIEF DESCRIPTION OF DRAWINGS

In drawings which illustrate embodiments of the invention, but which should not be construed as restricting the spirit or scope of the invention in any way.

FIG. 3 is a table numerically listing unmodulated volume data for a market index (S&P 500) at one minute intervals during a one day trading period (Jul. 7, 2005).

FIG. 7 is a table numerically listing intra-day volume data for a market index (S&P 500) averaged for multiple trading days 2005.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This application relates to a method and system for determining modulated volume information for a tradeable element. As used herein the term "tradeable element" means any element which may be traded during the course of a trading period. For example, a tradeable element may include a security or a commodity, or a group of securities or commodities, which are bought and sold in a market during the trading period. As used herein a "security" may include investment vehicles such as shares, stocks, bonds, convertible securities, options, derivatives, futures and currencies. A security (and hence a tradeable element) may also comprise a basket of securities including an index, sub-index or an entire exchange of securities, such as the S&P 500, the NASDAQ 100, the Russell 3000 and the like. A security may also relate to other market items which fluctuate in number at intervals during the course of a trading period, such as the number of contracts, ticks or open interest. A "commodity" may include any element of trade which can be bought or sold in a market, such as food items, oil, chemicals and other tangible or intangible items.

Figure 1:
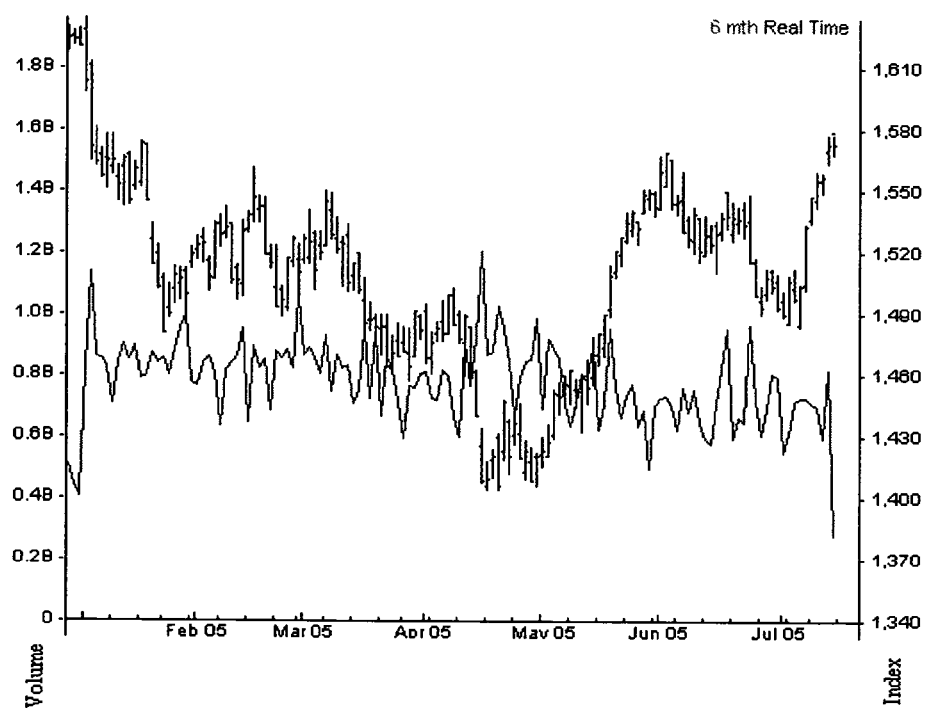
FIG. 1 is a graph showing averaged (one day) unmodulated volume data for a stock market index in conjunction with price data for a six month period.

As used herein the term "volume" refers to a measurable quantity of a tradeable element. As described further below, the volume of a particular tradeable element, such as the number of stocks traded on a securities index, typically fluctuates during the course of the trading period. Volume information thus reveals how active stocks or stock indices are during a particular trading interval. The trading interval may be an entire trading period (e.g. the time between the opening and the closing of a market on a selected trading day) or a specific portion or portions of the trading period. Volume information can be used to describe and analyze the activity of a stock or stock index either in isolation or in conjunction with other trading parameters, such as stock price. By way of illustration, FIG. 1 is a graph which illustrates the average daily cumulative volume of stocks traded on a stock market index (lower plot) during a six month period together with the index price for such stocks (upper plot) during the same period.

In the case of many tradeable elements, volume activity often follows certain predictable patterns or cycles during the course of a trading period, such as a particular trading day. For example, in financial securities markets, high volume levels are typically prevalent immediately after the opening of the market due to trades left over from the previous day and a large amount of at-market-open orders, lower values occur around noon when traders typically take their lunch break, thereby lowering the number of active participants in the market, and increased volume levels once again occur toward the end of the trading day when many short-term traders and institutional investors close their positions.

Figure 2:
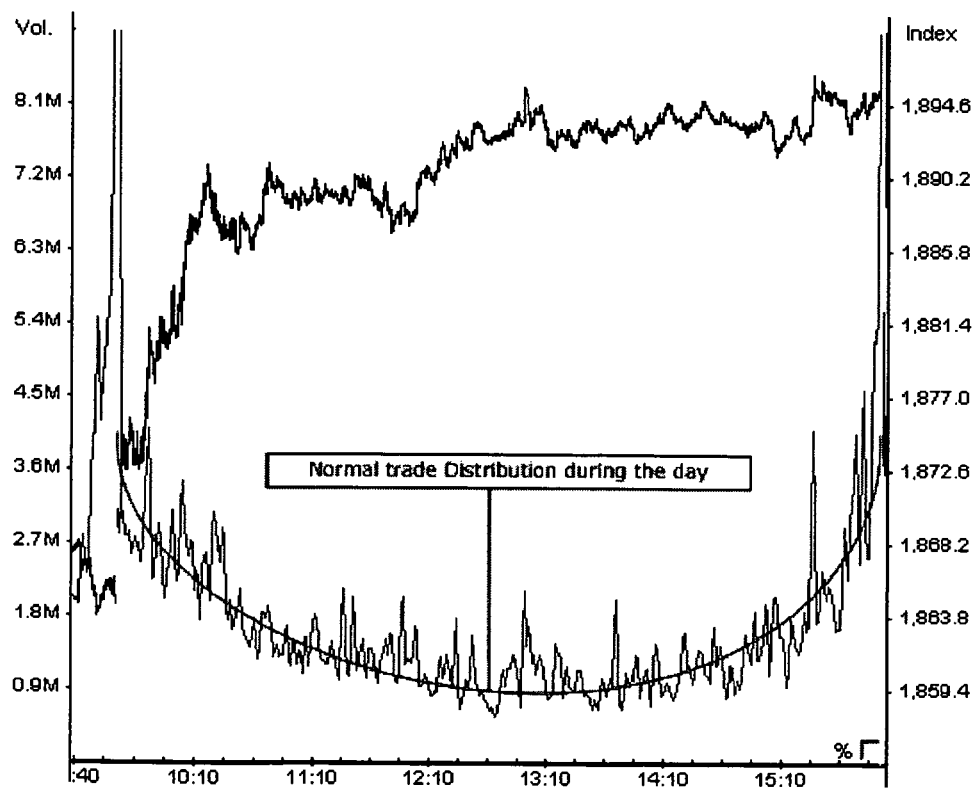
FIG. 2 is a graph showing a normal trade (volume) distribution for a market index at intervals during a one day trading period. The volume information is shown in conjunction with price information for the same period.

Most conventional volume indicators track cumulative volume amounts for an entire trading period, such as a day, but overlook or ignore fluctuations which occur at intervals during the trading period. FIG. 1 illustrates the conventional approach. In order to better illustrate significant volume activity, the Applicant has developed graphs as illustrated in FIG. 2 which show the distribution of trades at intervals during the course of a trading period, i.e. at intra-day trading intervals. As in FIG. 1, the volume information (lower plot) is presented in conjunction with price changes (upper plot) during the same period for convenience, although this is not critical. In the example of FIG. 2, the average volume of the index (in this case the S&P 500) was measured at one minute intervals from the opening of the market at 09:30 to the closing of the market at 16:00 and the volume information was plotted graphically. FIG. 3 is a table corresponding to FIG. 2 which numerically lists the intra-day volume data for the S&P 500 over the trading day in question.

Figure 4:
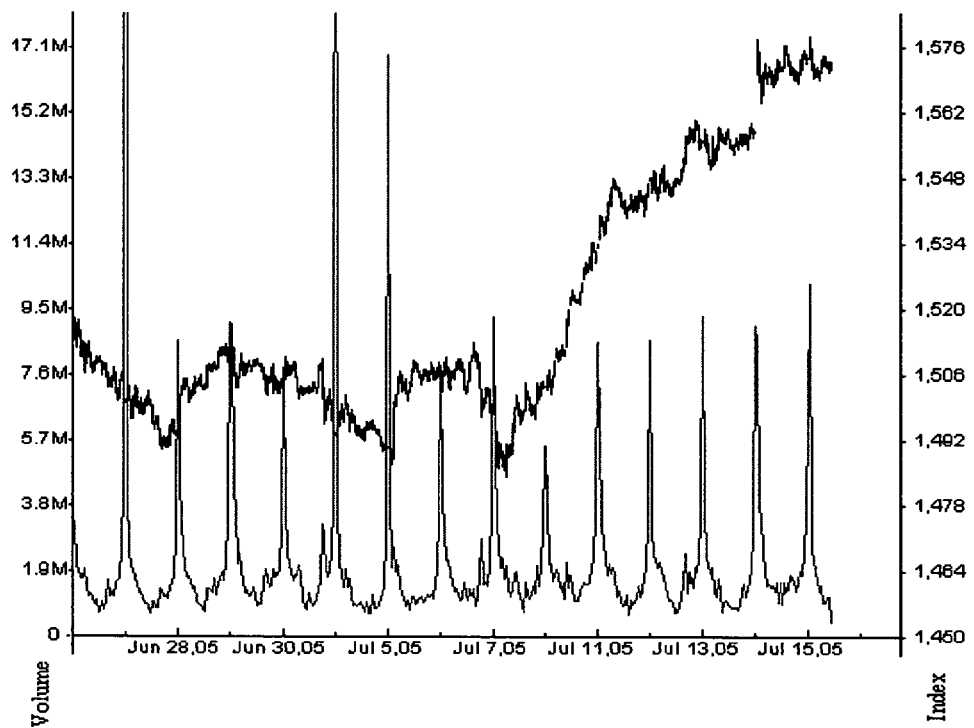
FIG. 4 is graph showing averaged volume data for a stock market index in conjunction with price data for a fifteen day period. Each bar of the volume plot of the graph represents 15 minutes of volume information.

In the example of FIG. 2, the time-dependent distribution of trades when plotted resembles the shape of an inverse parabola. The curve of the parabola thus represents the typical number of trades made at intervals during the course of the day. Accordingly, if the trading volume is below the parabola, the volume is considered to be below average. Likewise if the trading volume is above the parabola, the volume is considered to be above average. As shown in FIG. 4, which illustrates a 15 day period, this typical trade (volume) distribution is repeated daily in a predictable pattern or cycle.

Figure 5:
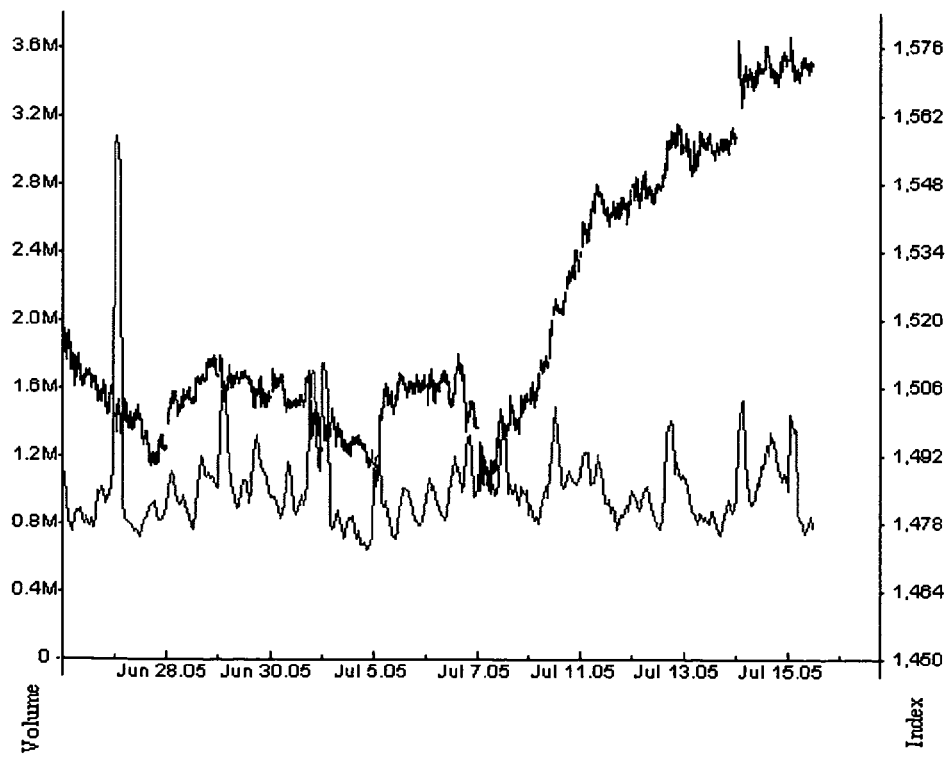
FIG. 5 is a graph showing the averaged volume data of FIG. 4 modulated in accordance with the invention to remove the effect of cyclic intra-day variation in the distribution of trades.

FIG. 5 illustrates the intra-day volume information of FIG. 4 modulated in accordance with the invention to remove the affect of cyclic variation in the distribution of trades during each trading period. By visualizing the volume information on an intra-day scale, abnormal increases or decreases in volume occurring at intervals during the course of a trading period can be more easily and quickly identified, and trading decisions can be made based on such volume information, as described further below.

While the means shown in FIGS. 2-4 for identifying abnormal volume activity with reference to a conventional intra-day distribution curve is helpful, there are some drawbacks to this approach. Not all markets for tradeable elements exhibit a trade distribution profile resembling an inverse parabola. Moreover, even in the case of tradeable elements, such as some securities indices, that do generally follow such a pattern, significant variations may occur at particular trading intervals due to various extraneous factors. For example, the distribution of trades on any given day may depend upon such factors as the time of year and holiday schedules, weather, geopolitical events or announcements, market shortages or surpluses, contractual or trading terms (e.g. expiration of options) and the like. Further, the intra-day volume distribution would also be affected if the particular day is a short trading day due to early market closures. In such cases, modulating volume information with reference to a standard trade distribution profile, such as the inverted parabola distribution of FIG. 3, can yield inaccurate information. For example, such a modulation method may obscure significant volume spikes or suggest market abnormalities where none exist.

The method and system of the present invention modulates volume information for a tradeable element with reference to actual historical trading data for the tradeable element rather than a standard trade distribution profile, such as an inverted parabolic curve. The term "modulated" as used herein refers to the process of modifying or altering volume information to present it in a different form. In the case of the present invention, an important purpose of the invention is to modulate volume information to more clearly and accurately reflect the actual trading activity of a tradeable element at intervals during the course of a trading period. This in turn enables traders to make trading decisions based on meaningful volume information not obscured by intra-day trade distribution factors or other identifiable extraneous factors.

Figure 6:
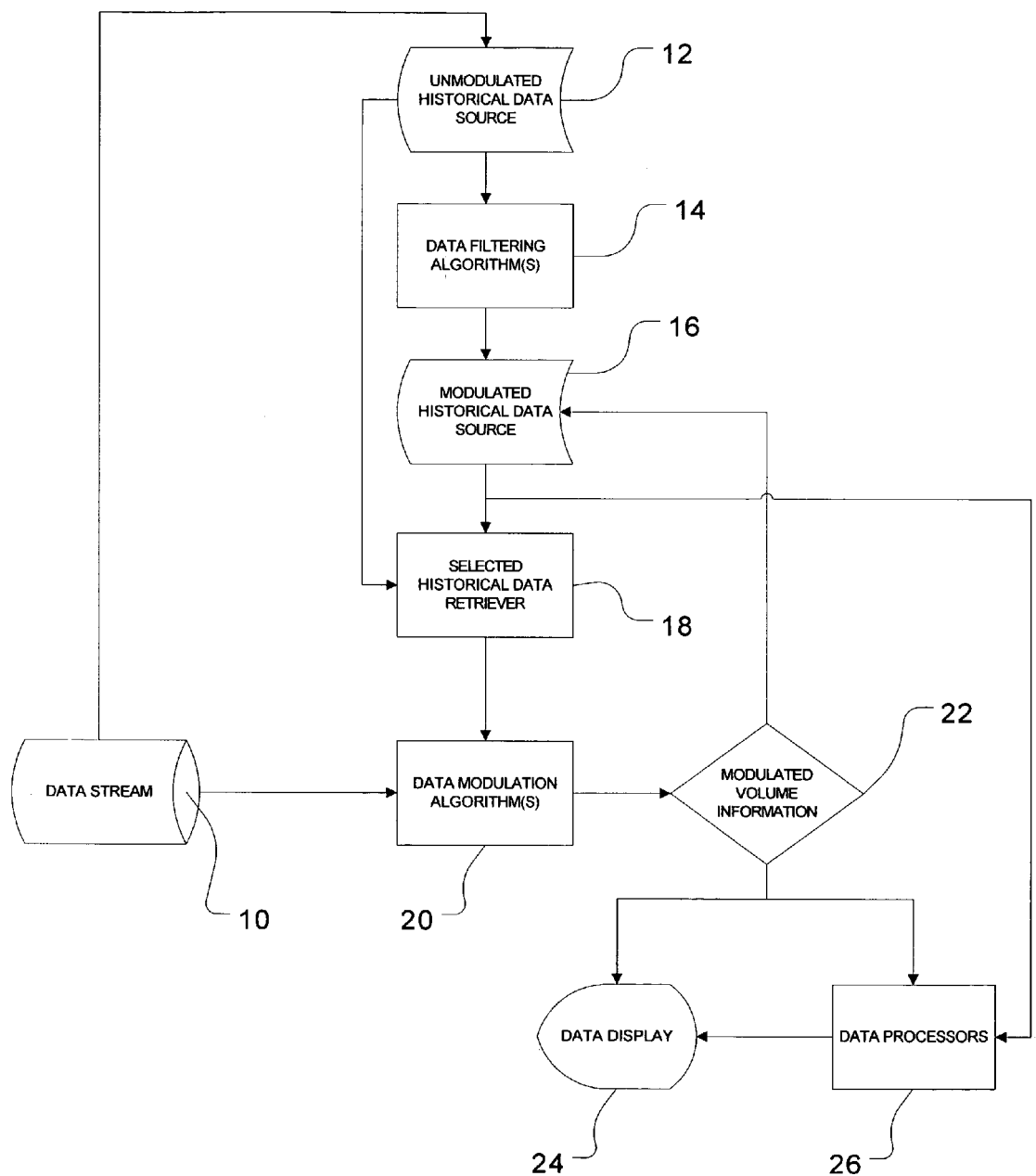
FIG. 6 is a flowchart schematically showing embodiments of the invention for determining modulated volume information from an unmodulated data stream.

As shown in FIG. 6, in one embodiment the invention comprises an unmodulated historical data source 12. For example, data source 12 could constitute a database configured to store unmodulated volume information for a tradeable element received from a data stream 10. Data stream 10 could constitute a real-time stream of volume information received electronically from a particular stock exchange or other data supplier. Alternatively, data stream 10 may be a source of previously stored, time-specific volume information. In one embodiment, data source 12 could store intra-day volume information received from data stream 10 for a particular securities index or other tradeable element on a minute by minute basis for each of a plurality of trading days. The historical volume information could span an entire year, collection of years or other time period(s).

By way of illustration, FIG. 3 illustrates in numerical table format the type of data that could be stored in unmodulated historical data source 12. In this example, "raw", unmodulated volume information for a particular trading index or other tradeable item could be obtained from data stream 10 and stored for each minute or other desired time interval (e.g. 5 minutes, 10 minutes, 15 minutes etc.) for an entire trading day. With reference to FIG. 3, the measured volume at 09:30 when the market opens is 26,351,200 shares, the measured volume one minute later at 09:31 is 9,529,200 shares, the measured volume a further minute later at 09:32 shares is 9,465,800, and so on.

As shown in FIG. 6, the unmodulated historical volume information stored in data source 12 could then optionally be processed or filtered according to one or more data filtering algorithms 14 to generate modulated historical data source 16. Historical data source 16 could constitute a database the same or separate from the database embodying unmodulated historical data source 12. For example, one algorithm 14 could determine which of the trading days stored in data source 12 for a selected time period exhibit a high volatility in volume according to a particular threshold. Another algorithm 14 could determine which of the trading days for the selected period stored in data source 12 exhibit a high volatility in price. Still other algorithms 14 could identify short trading days or other days or trading intervals within the selected time period which do not exhibit normal market patterns according to predetermined criteria. The filtered modulated historical data, for example excluding trading days having unusual volatility or other abnormal trading characteristics as described above, could then be stored as modulated historical data source 16 (FIG. 6). The modulated historical data comprising data source 16 would thus reflect normal trading patterns for the tradeable element in question during the selected time period free of at least some filterable historical anomalies.

As described further below, data source 16 could also comprise volume information modulated in other manners. For example, the modulated historical data stored as data source 16 could represent statistical averages of unmodulated historical data for the selected time period. By way of illustration, FIG. 7 is a table which shows numerically intra-day volume data for the S&P 500 averaged over multiple trading days in the calendar year 2005. In other words, the raw unmodulated intra-day volume information for the S&P 500 has been converted by a data filtering algorithm 14 into an averaged form representing historical intra-day norms for the portion of the calendar year in question. As shown in FIG. 7, the average volume of shares traded upon the market opening at 09:30 is 22,125,800. One minute later, at 09:31:00, the average volume has declined to 12,306,800 shares. The average volume continues to decline until it reaches a nadir of 2,591,900 shares at 12:56. The average volume of shares traded then gradually increases until at market closing the average volume is 12,528,300 shares. It is important to note that while the trade distribution pattern illustrated in FIG. 7 may generally resemble the inverted parabola of FIG. 2, the modulated historical data deviates from the standard curve at intervals during the day and is a much more precise and statistically meaningful benchmark than the standard curve.

Also, as mentioned above, the parabolic curve of FIG. 2 is not the standard trade distribution profile for many securities, markets and exchanges and hence it is not a benchmark of general application. For example, in some markets trading activity can reach its highest level at mid-day rather than at market opening and closing times. A much more reliable benchmark is actual historical data for the particular market in question (whether unmodulated or modulated as described above). The present invention therefore has the advantage that it is not restricted for use in markets or exchanges having particular trading characteristics but can be adapted to reflect the particular historical intra-day trading patterns of the tradeable element in question.

As shown in FIG. 6, a further feature of the invention is a retriever 18 for retrieving selected historical volume information from unmodulated historical data source 12 and/or modulated historical data source 16. For example, retriever 18 may extract modulated historical volume information from data source 16 representing the average historical volume for a tradeable element for a particular time period. With reference to FIG. 7, the average historical volume for the S&P 500 at time interval 09:31 is 12,306,800 shares. The modulated historical volume retrieved by retriever 18 (i.e. 12,306,800) could then optionally be compared to an average for the entire trading period to compute a numeric coefficient corresponding to the selected time period. With reference to the example of FIG. 7, the intra-day time with the lowest trading volume (i.e. 2,591,900 shares at 12:56) could be arbitrarily assigned the coefficient 1. In this example the coefficient $C_t$ for any other time interval t could be calculated in accordance with the following formulae:

$$C_t = V_{min}/V_t$$

where $V_{min}$ is the minimum average intra-day volume and $V_t$ is the average volume computed for time period t. In the particular example of FIG. 7 where t=09:31, the following would apply:

$$C_{09:31} = 2,591,900/12,306,800 = 0.211$$

Thus coefficient $C_t$ is an indicator of the typical relative historical activity of the tradeable element (in this case the S&P 500 index) at a particular interval in the trading period (09: 31). As mentioned above, in order to better reflect typical activity, the historical data used to calculate the coefficient could first be filtered to remove trading days having unusual high volatility, short trading days and/or other trading anomalies.

As will be apparent to a person skilled in the art, coefficient $C_t$ could optionally be calculated in numerous other ways. For example, coefficient $C_t$ could be calculated with reference to the highest intra-day trading volume or the average intra-day trading volume rather than the lowest intra-day trading volume. Many other mathematical variations are possible. In such cases coefficient $C_t$ would still function as an indicator of the typical relative historical activity of the tradeable element at a particular interval in the trading period.

With reference to FIG. 6, the coefficient $C_t$ could be calculated by retriever 18 based on historical data retrieved from data sources 12 and/or 16. Optionally each coefficient $C_t$ corresponding to a particular time interval could be predetermined. For example, the table of FIG. 7 lists coefficients predetermined for each time interval based on averaged data. In this case, retriever 18 could simply retrieve the particular coefficient from data source 16 for the desired time interval, the coefficient being representative of historical trading activity for that time interval as described above.

As will be apparent to a person skilled in the art, many variations in the means for storing, filtering and retrieving historical trading data are possible without departing from the invention. For example, rather than calculating a coefficient based on averaged modulated volume information stored in data source 16 for a particular time interval, retriever 18 could instead be configured to retrieve unmodulated volume information from data source 12. For example, retriever 18 could be configured to select from data source 12 only historical volume information for a precise day and time interval (for example, only volume information at time interval 09:31 for Wednesdays in July). Retriever 18 could optionally be configured to process the retrieved information, such as by calculating a volume average or other indicator reflecting typical historic market activity for the selected time interval.

As shown in FIG. 6, the coefficient or other historical indicator retrieved or determined by retriever 18 may be outputted to a data converter comprising data modulation algorithm(s) 20. Algorithm(s) 20 are configured to receive volume information (either current or historical) from data stream 10 and convert it into modulated volume information 22. The conversion step could be performed in real-time or after a time delay. For example, at 09:31 on a particular trading day the data converter 20 could be programmed to automatically retrieve unmodulated volume information from data stream 10 and multiply the volume amount by a numeric coefficient specific for that time interval (e.g. 0.211) provided by retriever 18, thereby determining the modulated volume information for that interval. The modulated volume information could then be displayed by a data display 24, stored as historical data in a database, such as data source 16, or outputted to data processors 26.

As mentioned above, data stream 10 may be a real-time source of data received form a data supplier such as a stock exchange or it may comprise a stream of previously stored data retrieved from data storage. In either case, the unmodulated volume data provided is correlated with a particular time interval within a current or historical trading period. As will be apparent to a person skilled in the art, the more recent the time interval for the unmodulated data provided by data stream 10, the more current will be the modulated volume information 22 outputted by data modulation algorithm(s) 20 (FIG. 6).

Figure 8:
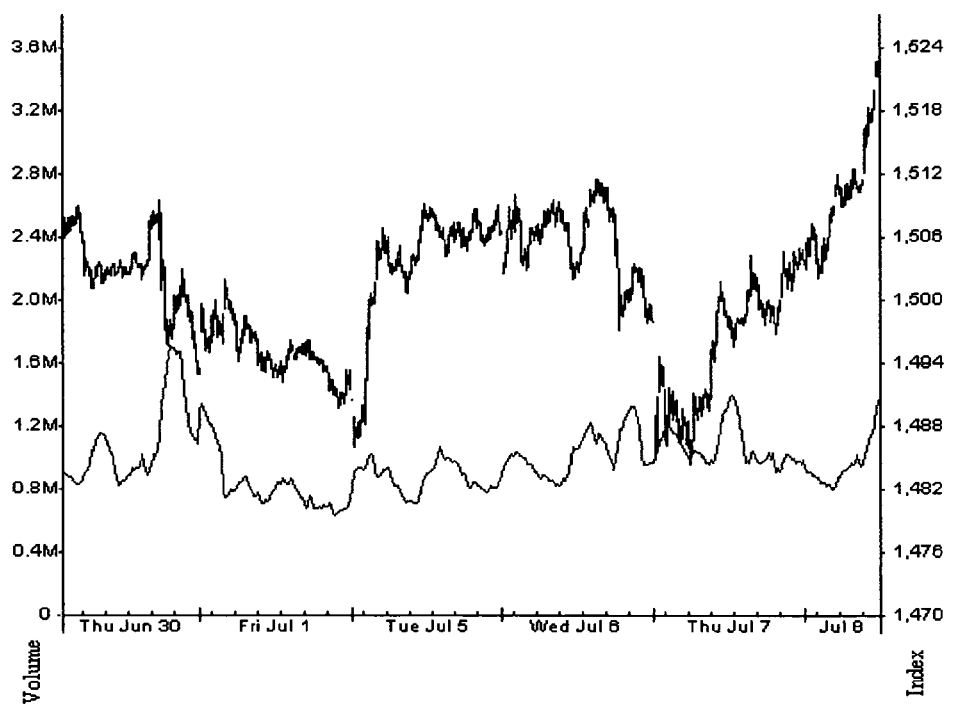
FIG. 8 is a graph showing moving averages of modulated volume information for a market index plotted in conjunction with price. Each bar of the volume plot of the graph represents 5 minutes of modulated volume information.

In one embodiment of the invention, data display 24 may be configured for graphically displaying modulated volume information 22, for example in a chart, table or graphical form for easy reference by a user. FIG. 8 shows one possible chart where modulated volume information 22 (lower plot) is displayed in conjunction with price information (upper plot) for the corresponding time intervals. Because the volume information has been modulated to remove fluctuations attributable to typical time-dependent intra-day time distribution factors, abnormal volume spikes or dips are much easier to identify and track.

As mentioned above, once modulated volume information 22 has been determined, it can be optionally stored in modulated historical data source 16 or in a separate database (i.e. once determined, volume information 22 may be saved as historical volume information for the time interval in question). Data processors 26 may comprise one or more algorithms for further processing modulated volume information 22, for example to generate trading signals or alerts when abnormal market activity is detected. Data processors 26 may also comprise algorithms for analyzing historical volume information in conjunction with other market information, such as price data. As will be appreciated by a person skilled in the art, many different types of technical analysis may be envisioned which could usefully employ modulated volume information 22. For example, data processors 26 may calculate and output to data display 24 (FIG. 6) moving averages of modulated volume information for selected time periods. The historical data required to calculate such moving averages could be retrieved from modulated historical data source 16 or some other source. The modulated volume moving averages could range in duration from as short as a few minutes to as long as several months or years. Other technical analysis indicators and tools which could employ modulated volume information 22 include modulated volume advance/decline indicators, volume up/down indicators and modulated volume oscillators. Further, intra-day modulated volume information could be further processed and converted to daily volume information for a particular interval, thereby showing the influence of intra-day volume fluctuations on price.

Figure 9:
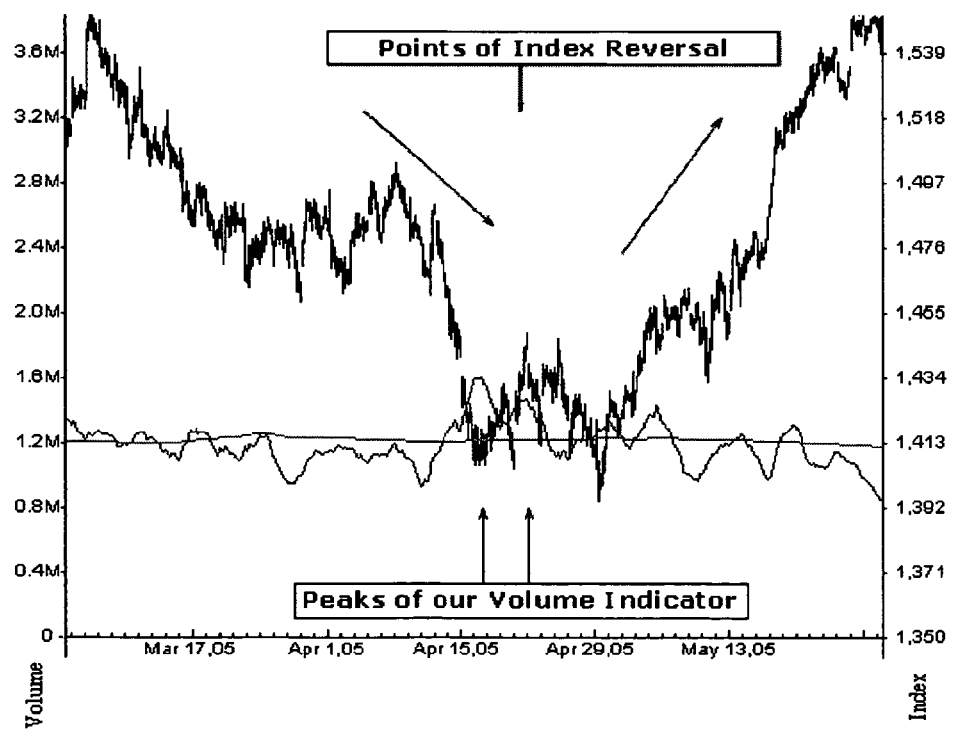
FIG. 9 is a graph showing the relationship between modulated volume spikes and a subsequent reversal in a market index price trend.

One of the premises of the present invention is that volume and market index behaviours are closely related and that trading patterns of an index can be predicted, or at least anticipated, from a proper understanding of unfolding modulated volume patterns. Volume analytics generated by processors 26 thereby provide traders with an elegant way of monitoring and analyzing the volume behaviour of a tradeable element, such as a particular index or sub-index, and allow traders to heed one of the golden rules of trading, "Do not play against the market". Index values will often (sometimes immediately, sometimes with a delay) react to volume spikes, and the greater the magnitude of the spike (or series of spikes), the stronger the ensuing reaction. As mentioned above, there are many complex reasons why volume surges may occur. FIG. 9 illustrates this feature with reference to recent historical trading data for a particular securities index, namely the S&P 500. FIG. 9 shows moving averages of modulated volume information for an approximate three month period (March-May, 2005). As shown in the FIG. 9 chart, two abnormal volume spikes occurred in late April of 2005. The relative size, number and frequency of abnormal modulated volume spikes can provide valuable information regarding likely market trends. In the FIG. 9 example, the two volume spikes correspond with a distinct trend change for the S&P 500. In particular, following the volume spikes, the market downtrend in the S&P 500 reversed and switched to a steady up-trend as shown in FIG. 9. A modulated volume analysis chart, such as may be generated by data processors 26 and displayed by data display 24 (FIG. 5), can provide insight why such a reversal may have occurred.

In many cases the relationship between volume spikes and index reversals applies equally well to both long-term and short-term index changes. Various technical considerations apply. As mentioned above, comparatively larger or longer modulated volume spikes are ordinarily more significant indicators of market activity than smaller spikes. The greater the magnitude and duration of a volume spike, the greater the likelihood that the supply/demand balance will be altered over the long-term. By studying the volume patterns of an entire index (i.e., a basket of many securities as opposed to just a single stock), you can see this wholesale exchange of shares occurring for entire sectors—or even at the level of the broad market. This process of transferring huge numbers of shares often precedes key market reversals (index turning points).

Caution must be exercised, however, when analyzing volume spikes over a very short time frame as their potential impacts on mid or long-term market trends can be misjudged. A noteworthy volume spike appearing on a 5 minute chart of modulated volume information may well affect an index in the short-term, but it may not necessarily have a significant impact on the prevailing long-term market trend. The present invention enables traders to analyze volume spikes in a broader market context by consulting several charts generated by the method and system of FIG. 6 having different settings. For example, historical modulated volume moving averages ranging from intra-day to 2 years could be viewed as described above to ensure that current market activity is considered fully in the context of past events. By considering only modulated volume information 22, the present invention ensures that past data is not distorted by historically normal volume fluctuations during the trading period (e.g. intra-day fluctuations).

Although the present invention has been illustrated principally in relation to financial market indices, it has wide application in respect of other tradeable elements which fluctuate in volume during the course of trading periods, especially tradeable elements which repeatedly fluctuate according to predictable patterns. For example, the invention could be applied to single securities rather than groups or indices of securities. The invention could also be applied to measurable quantities of other volume-related items, such as the number of contracts (e.g. options), ticks and open interest at intervals within a trading period. The invention provides a means for removing the effect of historically normal volume fluctuations during a trading period so that more significant abnormal market activity can be more easily visualized and acted upon in a timely manner, if desired.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A data processor-implemented method of modulating volume information for a tradeable element to compensate for normal volume variation in said volume information during a trading period, said method comprising:

(a) storing in a database a historical data source containing historical volume information, having normal volume variation, for said tradeable element for a plurality of historical time intervals;

(b) obtaining, from an electronic data source, unmodulated volume information for said tradeable element for a selected time interval in said trading period that contains both normal and abnormal volume variations such that said abnormal volume variation is substantially incapable of visualization by a user due to the presence of said normal volume variation;

(c) retrieving from said database storing said historical data source at least a portion of said historical volume information for one or more of said plurality of historical time intervals corresponding to said selected time interval of said unmodulated volume information;

(d) providing, to a data processor, selected data representing said portion of said historical volume information for said one or more of said historical time intervals corresponding to said selected time interval of said unmodulated volume information;

(e) converting, by said data processor said unmodulated volume information for said selected time interval to modulated volume information for said selected time interval by applying said selected data to remove said normal volume variation from said unmodulated volume information to thereby reveal said abnormal volume variation in said modulated volume information for said tradeable element during said selected time interval such that said abnormal volume variation is substantially capable of visualization by the user; and (f) displaying, on a data display, said modulated volume information having said abnormal volume variation with said normal volume variation removed.

2. The method as defined in claim 1, wherein said selected data is a numeric coefficient stored in said database.

3. The method as defined in claim 2, further comprising computing said numeric coefficient based on historical volume information corresponding to said selected time interval.

4. The method as defined in claim 2, wherein said converting step comprises inputting said coefficient into at least one data modulation algorithm.

5. The method as defined in claim 1, wherein said trading period is a current period.

6. The method as defined in claim 5, wherein said selected time interval is a recent interval.

7. The method as defined in claim 1, wherein said trading period is a historical period.

8. The method as defined in claim 1, further comprising filtering said historical volume information to remove extraneous data prior to storing said historical volume information in said database.

9. The method as defined in claim 1, wherein said tradeable element is traded in a market and wherein a volume of trades made in said market ordinarily fluctuates during said trading period.

10. The method as defined in claim 9, wherein said tradeable element is a commodity.

11. The method as defined in claim 9, wherein said tradeable element is a security.

12. The method as defined in claim 11, wherein said security is a financial security.

13. The method as defined in claim 12, wherein said financial security is an investment vehicle.

14. The method as defined in claim 12, wherein said financial security is selected from the group consisting of shares, stocks, bonds, convertible securities, options, derivatives, futures, currencies or groups or sub-groups of securities comprising one or more of the foregoing.

15. The method as defined in claim 12, wherein said financial security is a securities index corresponding to all or a portion of a financial market.

16. The method as defined in claim 1, wherein said displaying comprises graphically representing said modulated volume information.

17. The method as defined in claim 1, wherein said displaying comprises displaying said modulated volume information in conjunction with price information for said selected time interval.

18. The method as defined in claim 1, wherein said displaying comprises displaying said modulated volume information in real-time during said trading period.

19. The method as defined in claim 1, further comprising storing said modulated volume information in said historical data source.

20. The method as defined in claim 1, further comprising outputting said modulated volume information to one or more further data processors.

21. The method as defined in claim 20, further comprising operating said one or more further data processors to generate average modulated volume information for a time period including said selected time period.

22. The method as defined in claim 21, wherein said displaying comprises displaying said modulated volume information as average modulated volume information.

23. The method as defined in claim 1, wherein said obtaining unmodulated volume information comprises receiving a real-time data stream of said unmodulated volume information from a data provider during said trading period.

24. The method as defined in claim 1, wherein said obtaining unmodulated volume information comprises retrieving said unmodulated volume information from said or a further database.

25. The method as defined in claim 1, wherein said selected data is a numeric coefficient stored in said database which is predetermined based on said historical volume information corresponding to said selected interval.

26. The method as defined in claim 25, wherein said trading period is a trading day and wherein said selected time interval is an intra-day interval within said day.

27. The method as defined in claim 1, wherein said historical volume information comprises average volume information for at least some of said historical time intervals.

28. The method as defined in claim 1, wherein said modulated volume information is stored in said database.

29. The method as defined in claim 1, further comprising filtering said historical volume information to remove extraneous data prior to storing said historical volume information in said database, wherein said filtering comprises removing extraneous data derived from trading intervals having atypical volume or price volatility.

* * * * *